UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO NATIONAL CARBON COMPANY, INC., OF NEW YORK, N. Y., A CORPORATION OF NEW YORK.

RECLAIMING DRY BATTERIES.

1,374,003. Specification of Letters Patent. Patented Apr. 5, 1921.

No Drawing. Application filed September 29, 1917, Serial No. 194,072. Renewed June 14, 1920. Serial No. 388,983.

*To all whom it may concern:*

Be it known that we, CARLETON ELLIS and ALFRED A. WELLS, citizens of the United States, and residents of Montclair, in the county of Essex and State of New Jersey, have invented certain new and useful Improvements in Reclaiming Dry Batteries, of which the following is a specification.

This invention relates to a method of reclaiming dry batteries of the Leclanche type and involves two modifications, one, direct chemical treatment, and the other, heat treatment, followed or not, as the case may be, by chemical treatment.

The ordinary dry battery has a comparatively short life due to the fact that the solution which it contains is relatively quickly exhausted. Oftentimes this happens long before any very material consumption of the zinc element has occurred. Sometimes, in fact, the voltage of the battery will fall rapidly so that the battery becomes useless, in an automobile for instance, for operating an ignition system and the battery is discarded. Such a battery contains a considerable amount of zinc, with brass binding posts, carbon pencil, a mixture of graphite and manganese dioxid as depolarizing material, salts such as ammonium chlorid and zinc chlorid and a sealing mass of pitch. By the present process all these materials may be recovered to a greater or less degree.

By the chemical treatment, for example, the used cell may be placed in a reagent such as a solution of sulfuric or hydro-chloric acid, or preferably in a solution containing from 10 to 20% more or less of sodium bisulfate or sodium acid sulfate, such as niter cake and similar acid salts, which form a by-product in the manufacture of acids. Caustic soda may be employed in some cases as the reagent. A solution of sodium bisulfate, which may be heated if desired, dissolves the zinc container, leaving the solder intact, which may be collected. The brass binding posts may or may not be attacked according to the conditions of operation, and when not greatly affected by exposure to the acid liquor, may be directly recovered. The paper usually surrounding the depolarizing mass is then removed and the depolarizing mass preferably separated from the carbon rod. The latter may be washed or boiled in water or dilute acid to free from salts and may be used again. The graphite and manganese dioxid may be washed to remove zinc chlorid, ammonia and ammonium salts or any soluble manganese salts and the insoluble material may be treated with an oxidizing agent such as sodium hypochlorite or chlorin in water at the boiling point, potassium permanganate and similar agent to raise the degree of oxidation to the dioxid condition to a sufficient extent so that the mass may again be used for depolarizing purposes. In some cases if considerable manganese material is present in a soluble form, the depolarizing mass without washing, may be treated with the oxidizing agent to precipitate manganese from the soluble salts and also to secure oxidation of the lower oxids of manganese or insoluble manganese bodies to form the higher oxids, for depolarizing purposes. The mass may be treated to remove zinc chlorid and ammonium salts and these may be separated and refined, if desired. The pitch which is customarily used to seal the top of the container is of course, preferably removed before these operations are conducted.

Dry batteries are found in two forms, the ordinary size used for electric bell purposes, automobile ignition systems and the like, and the miniature batteries used for flashlights, etc. In the former, it is customary to use mineral manganese dioxid or pyrolusite in the depolarizing mass, while in miniature batteries it is particularly the custom to use an artificial hydrated manganese dioxid. The latter is much more expensive than the mineral manganese dioxid. In the discharge of a dry battery containing the mineral manganese dioxid the latter is reduced to a compound or compounds of the lower oxids or to the lower oxids themselves and are thus present in a form capable of extraction by mixing with dilute acid or some similar procedure to form a manganese solution which may be subsequently oxidized by treatment with an oxidizing agent such as by boiling with sodium hypochlorite or similar procedure to yield hydrated manganese dioxid, for example, deep black hydrated manganese dioxid, useful in the manufacture of depolarizing mixtures for miniature cells, especially if a pure hydrate is prepared. In this way the operation of the large size dry battery containing mineral manganese serves to produce a lower form of manganese capable of reoxidation to the hydrated form for use in the more expensive miniature cells. In a similar manner the manganese compounds may be converted into the nitrate for example, and roasted in air or oxygen to form manganese dioxid. This may be done in the presence of the graphite if desired. If roasting does not completely oxidize to manganese dioxid, a further treatment of the mass may be carried out with potassium permanganate. The roasting should be carried out under temperature conditions to produce the dioxid without heating to a point where too dense a material would be secured for satisfactory use in miniature batteries. Of course, if the material is used in the large size batteries, there is not the need of such care in the oxidation by roasting. The zinc salts or basic zinc compounds which are obtained may be sold as such or may be reduced to the metallic condition if desired. Thus the products obtained may be employed to reconstruct new batteries or may be used in the arts in different ways according to local conditions.

The second modification of the process contemplates a thermal treatment which preferably involves heating of the battery to temperatures graduated to make a separation of some of the components of the battery in a cheap and efficient manner. To this end the battery or batteries may be placed in a muffle furnace and heated until the pitch is softened and is collected and removed. The temperature is gradually raised until the solder softens and the zinc covering may be stripped from the battery by hand or by mechanical device, as for example, by agitating in a tumbler. The paper lining which is in contact with the zinc, also usually readily comes off under these conditions. While hot, the depolarizing mass separates with considerable ease from the carbon pencil, hence the depolarizing agent may be readily removed and the carbon pencil recovered, which may be washed and reused. Any fumes of ammonium chlorid or ammonia vapors produced during the operation may be collected. Ordinarily the temperature may be kept below the point at which ammonium chlorid sublimes. The depolarizing mass may be extracted with water to remove the soluble salts which are collected and the zinc salts separated from the ammonium salts, or manganese salts, if present. For example, if it contains the manganese salt, the solution may be treated by boiling with hypochlorite to produce manganese dioxid which is collected. The ammonium salts may be recovered in any suitable manner and ammonium chlorid may be produced therefrom to be used again in new batteries if desired. In the case of zinc containers made from spun metal and having no soldered seams, the temperature should be raised to melt the zinc or the container may be cut by a special machine and the zinc removed in a mechanical way. It is also possible to apply the same procedure to soldered containers.

Considering, for sake of illustration, the ordinary soldered container, an apparatus may be arranged involving mechanical appliances for passing the spent batteries through a furnace or heated chamber so as to allow the pitch to run off and then to melt the solder. The batteries are then placed in a tumbler and shaken or rattled, thereby removing the zinc container and bibulous paper, and separating the carbon pencils from the depolarizing agent. The latter usually breaks up into a powder. A certain amount of the depolarizing agent may cling somewhat tenaciously to the paper however. The depolarizing agent passes through screens and the mixture of sheet zinc, carbon pencils and paper linings is conveyed to a point where the separation of these materials may be made mechanically or by hand as desired. The zinc sheets are collected and may be melted. The carbon pencils, as stated, may be washed and reused. If some of them are considerably abraided by the tumbling action, these may be ground up and may find application in admixture with manganese dioxid for depolarizing purposes. The bibulous paper contains a certain amount of soluble and insoluble salts or basic bodies and also some adhering depolarizing agent. As a rule the former may be extracted by boiling with water or dilute acid and the salts recovered and separated if desired. In case the depolarizing agent cannot be readily removed otherwise, the paper may be ignited and the depolarizing agent thus separated and purified as may be desired. The depolarizing mass obtained from the tumbler may be extracted with water or dilute acid to get out the soluble salts. Any zinc or ammonium salt present may be duly separated from the manganese salts. Manganese dioxid may be prepared, such for example, as deep black good conducting manganese dioxid, used in miniature dry batteries. The spent depolarizing agent may be oxidized, if desired, by roasting or treatment with an oxidizing agent such as hypochlorite, in some cases followed by treatment with potassium permanganate to oxidize any residual lower oxids of manganese. If desired, in view of the fact that the discharge of a battery containing mineral manganese dioxid produces a lower form of manganese oxid or salt, the spent depolarizing mass may be extracted with hydrochloric, sulfuric or nitric acid and the like, to get a lower form of manganese dioxid which may be suitably oxidized to form the artificial hydrated product or may be roasted to form anhydrous manganese dioxid or manganite as the case may be. In fact, in referring to the production of manganese dioxid as a depolarizing agent it should be understood that broadly speaking, what we have in mind is the production of a higher oxid of manganese or compound of manganese in a higher state of oxidation suitable for depolarizing purposes.

It is not necessary, however, to convert the manganese into depolarizing material but manganese salts may be made therefrom and in fact, the depolarizing action, resulting as it does, in the production of lower oxids of manganese or compounds thereof serves to convert what ordinarily is regarded as a fairly resistant compound into one easily attackable by acids, thereby enabling the simple production of manganese salts from what has heretofore been a waste product or waste material.

When the zinc element of the battery has been eaten or corroded to such an extent that a good deal of the zinc is in a very thin or flaky form the separation of the metal should be carried out with due consideration for these conditions. The upper part of the zinc container of the battery is less likely to be attacked during the operation of the battery than the lower part, hence the upper portion containing the usual brass connections or binding posts sometimes may be separated from the rest of the material in an advantageous manner.

Many of the spent batteries when opened give off the odor of ammonia and from the contents may be extracted a white flaky precipitated material readily soluble in hydrochloric acid and being a hydrate of zinc or a basic compound of zinc. This material may be separated and the content of zinc utilized as desired.

What we claim is:—

1. The process of reclaiming spent dry batteries of the Leclanche type which comprises heating the battery to a temperature to melt the pitch and soften the solder, in stripping the zinc sheet from the carbon and depolarizing element, in separating the carbon element, and in reviving the depolarizing material.

2. The process of reclaiming spent dry batteries of the Leclanche type which comprises heating the battery to a temperature to soften the solder, in removing the zinc sheet from the depolarizing element and in separating the carbon element.

3. In the process of reclaiming spent batteries of the Leclanche type, the step which comprises agitating the carbon pencil and adhering depolarizing material, whereby the latter is separated from the pencil.

4. In the process of reclaiming spent batteries of the Leclanche type, the step which comprises agitating the carbon pencil and adhering depolarizing material in a heated state, whereby the latter is separated from the pencil.

5. In the process of reclaiming spent batteries of the Leclanche type, the step which comprises stripping the carbon pencil from adhering depolarizing material.

6. The process of reclaiming spent batteries of the Leclanche type, which comprises removing the metal container and separating at least some of the component parts of the contents of said container.

7. In the process of recovering or reclaiming spent batteries of the Leclanche type, the step which comprises treating the spent depolarizing material with an oxidizing agent to reoxidize the manganese material.

8. In the process of recovering or reclaiming spent batteries of the Leclanche type, the step which comprises treating the spent depolarizing material admixed with graphite with an oxidizing agent to reoxidize the manganese material.

9. In the process of recovering or reclaiming spent batteries of the Leclanche type, the step which comprises treating the spent depolarizing material with an oxidizing agent.

10. In the process of reclaiming spent batteries of the Leclanche type, the step which comprises heating the batteries to a temperature at which the solder melts but the zinc remains intact and in subsequently removing the zinc in the form of sheets or sheet fragments.

11. In the process of reclaiming spent batteries of the Leclanche type, the step which comprises heating the batteries to a temperature at which the solder melts and in subsequently removing the zinc.

12. In the process of reclaiming spent batteries of the Leclanche type, the step which comprises heating the batteries, and in removing the zinc in the form of sheets or sheet fragments.

13. In the recovery from spent batteries of the materials used in the manufacture of dry batteries of the Leclanche type, the step which comprises extracting from the depolarizing material the water soluble salts which are present.

14. In the recovery from spent batteries of the materials used in the manufacture of dry batteries of the Leclanche type, the step which comprises separating the spent depolarizing agent, in acting on it with a reagent to dissolve manganese compounds, and in oxidizing the manganese solution so obtained to produce a higher oxid of manganese.

15. In the recovery from spent batteries of the materials used in the manufacture of dry batteries of the Leclanche type, the step which comprises separating the spent depolarizing agent consisting of manganese material and carbon, in acting on it with a reagent to dissolve manganese compounds, and in oxidizing the manganese solution so obtained to produce a higher oxid of manganese.

16. In the recovery from spent batteries of the materials used in the manufacture of dry batteries of the Leclanche type, the step which comprises separating the spent depolarizing mass comprising carbon and manganese bodies, in acting on it with an acid to dissolve manganese compounds, and in oxidizing the manganese solution so obtained to produce a higher oxid of manganese.

CARLETON ELLIS.
ALFRED A. WELLS.